(12) United States Patent
Kim

(10) Patent No.: US 9,547,138 B2
(45) Date of Patent: Jan. 17, 2017

(54) LIGHT RECEIVING MODULE HAVING BUILT-IN WAVELENGTH-TUNABLE WAVELENGTH-SELECTIVE FILTER

(71) Applicant: PHOVEL.CO.LTD., Daejeon (KR)

(72) Inventor: Jeong-Soo Kim, Gongju-si (KR)

(73) Assignee: PHOVEL.CO.LTD., Yuseong-Gu, Daejeon (KR)

( * ) Notice: Subject to any disclaimer, the term of this patent is extended or adjusted under 35 U.S.C. 154(b) by 0 days.

(21) Appl. No.: 14/889,454

(22) PCT Filed: Aug. 18, 2014

(86) PCT No.: PCT/KR2014/007637
§ 371 (c)(1),
(2) Date: Nov. 6, 2015

(87) PCT Pub. No.: WO2015/023164
PCT Pub. Date: Feb. 19, 2015

(65) Prior Publication Data
US 2016/0154194 A1 Jun. 2, 2016

(30) Foreign Application Priority Data

Aug. 16, 2013 (KR) .................... 10-2013-0097442

(51) Int. Cl.
*G02B 6/42* (2006.01)
*G02B 6/293* (2006.01)
(Continued)

(52) U.S. Cl.
CPC ......... *G02B 6/4215* (2013.01); *G02B 6/29395* (2013.01); *G02B 6/325* (2013.01);
(Continued)

(58) Field of Classification Search
CPC ... G02B 6/29395; G02B 6/325; G02B 6/4206; G02B 6/4208; G02B 6/4209; G02B 6/4215; G02B 6/4246; G02B 27/141
See application file for complete search history.

(56) References Cited

U.S. PATENT DOCUMENTS

| 5,127,075 A * | 6/1992 | Althaus ................ G02B 6/4246 250/227.14 |
| 5,663,821 A | 9/1997 | Suda et al. |
| 6,142,680 A * | 11/2000 | Kikuchi ................ H04B 10/40 385/47 |
| 7,013,069 B1 * | 3/2006 | He ....................... G02B 6/4246 385/33 |
| 2003/0151818 A1 | 8/2003 | Wagner et al. |
| 2004/0071413 A1 | 4/2004 | Tsumori |

(Continued)

FOREIGN PATENT DOCUMENTS

| CN | 101852903 A | 10/2010 |
| JP | 08-160259 A | 6/1996 |

(Continued)

OTHER PUBLICATIONS

Chinese Office Action corresponding to 201480029616.X mailed on Jun. 1, 2016.
(Continued)

*Primary Examiner* — Ryan Lepisto
(74) *Attorney, Agent, or Firm* — Davis & Bujold PLLC; Michael J. Bujold

(57) ABSTRACT

A light receiving module having a built-in wavelength-tunable wavelength-selective filter that can selectively receive light with a specific wavelength from laser light with various wavelengths emitted from an optical fiber and tune the specific wavelength. In the light receiving module including a light receiving element having a built-in wavelength-tunable wavelength-selective filter that receives laser light from an optical fiber according to the present invention, a flat plate-shaped window (240) transmitting laser light from an optical fiber (600) is formed in the light receiving element (22), a wavelength-tunable wavelength-selective filter for separating wavelengths of laser light traveling as parallel light is disposed in the light receiving element (22), and a lens (400) converting laser light from the optical fiber (600) into parallel light is disposed between the optical fiber (600) and the light receiving element (22).

8 Claims, 7 Drawing Sheets

(51) Int. Cl.
*G02B 27/14* (2006.01)
*G02B 6/32* (2006.01)
(52) U.S. Cl.
CPC ......... *G02B 6/4209* (2013.01); *G02B 6/4246* (2013.01); *G02B 27/141* (2013.01); *G02B 6/29361* (2013.01); *G02B 6/4206* (2013.01); *G02B 6/4208* (2013.01)

(56) References Cited

U.S. PATENT DOCUMENTS

| | | | | |
|---|---|---|---|---|
| 2004/0208442 | A1* | 10/2004 | Shi | G02B 6/327 385/34 |
| 2008/0205887 | A1* | 8/2008 | Murano | H04B 10/675 398/48 |

FOREIGN PATENT DOCUMENTS

| | | | |
|---|---|---|---|
| JP | 09080274 A | * | 3/1997 |
| JP | 2012-083424 A | | 4/2012 |
| KR | 100724820 B1 | | 6/2007 |
| KR | 10-2011-0095084 A | | 8/2011 |
| KR | 10-2013-0012634 A | | 2/2013 |

OTHER PUBLICATIONS

International Search Report corresponding to PCT/KR2014/007637 mailed Nov. 24, 2014.

* cited by examiner

- Prior Art -

- Prior Art -

- Prior Art -

- Prior Art -

- Prior Art -

LIGHT RECEIVING MODULE HAVING BUILT-IN WAVELENGTH-TUNABLE WAVELENGTH-SELECTIVE FILTER

TECHNICAL FIELD

The present invention relates to a light receiving module having a built-in wavelength-selective filter, and more particularly, to a light receiving module having a built-in wavelength-tunable wavelength-selective filter that can selectively receive light with a specific wavelength from laser light with various wavelengths emitted from an optical fiber and can tune the specific wavelength. Further, the present invention relates to a light receiving module for bidirectional communication that includes a wavelength-tunable receiver that can tune and selectively receive a light receiving wavelength from an optical fiber. The light receiving module optically couples a light transmitting element that outputs parallel light and an optical fiber, using one lens attached to the optical fiber and making laser light used for transmitting/receiving optical signals into parallel light, and optically couples a light receiving element that receives parallel light and an optical fiber, using a lens attached to the optical fiber.

BACKGROUND ART

A light receiving module for optical communication in the related art is illustrated in FIG. 1. Laser light emitted from an optical fiber illustrated in FIG. 1 has the features of emissive light emitted at a predetermined angle. In order to effectively receive such emissive light, there is a need for a lens that can converge laser light with a photodiode for receiving light, and in the related art, light receiving elements included a lens, so the light receiving elements and an optical fiber were optically aligned to receive light. Further, bidirectional light transmitting/receiving modules in the related art, as illustrated in FIG. 2, were manufactured to send signals to an optical fiber, using an assembly of a TO (Transistor outline) type light transmitting element equipped with a lens on the outer side and a TO type light receiving element equipped with a lens. In general, light transmitting elements include a semiconductor laser diode chip, which emits light in the type of emissive light having a predetermined emission angle. Accordingly, in order to collect light emitted from a laser diode chip, which emits light in the type of emissive light having a predetermined emission angle, to an optical fiber, there is a need for a lens that converts emissive light into converging light between a laser diode chip and an optical fiber, so light transmitting elements, as in FIG. 2, is equipped with a lens and converts laser light, which is emitted from a laser diode chip therein, into converging light and optically coupling it to an optical fiber. Laser light for receiving is emitted from an optical module for bidirectional communication to the same optical fiber that receives light for transmitting. Laser light emitted from an optical fiber is also emissive light having a predetermined emission angle, so the size of the laser light increases in proportion to the traveling distance of the light. Photodiodes in optical receiving elements are usually very small in dozens of nanometers, so there is a need for a lens for converging laser light having the features of emissive light from an optical fiber to a photodiode, as in FIG. 2, in order to converge light emitted from an optical fiber to those very small photodiodes.

As illustrated in FIGS. 1 and 2, in common light receiving modules or common bidirectional optical communication modules, a lens is included in a light receiving element, so laser light having the features of emissive light and emitted from an optical fiber converges into a light receiving area of a photodiode in the light receiving element. However, laser light travels at different angles, depending on areas, between the lens and the light receiving area of the photodiode. This is illustrated in FIG. 3. That is, laser light from, an optical, fiber 600 becomes converging light that converges to a light receiving area 211 of a photodiode 210 through a lens 410 in a light receiving element 20.

Recently, a communication standard of NG-PON2 (Next Generation Passive optical Network 2) has been established by ITU (International Telecommunication Union), in which a wavelength, multiplying method using one optical fiber using four channel wavelengths has been employed, so the communication standard requires a wavelength-tunable light receiving element that can tune and selectively receive specific wavelengths. Tuning and selectively receiving wavelengths can be easily achieved by mounting a wavelength-tunable wavelength-selective filter, which can tune a wavelength, between a lens and a photodiode in a light receiving element. However, when light having a specific wavelength is selectively transmitted using a wavelength-tunable filter, the wavelength of the transmitted light depends on the incident angle on the wavelength-selective filter. Accordingly, in order to effectively select and transmit a specific wavelength using a wavelength-selective filter, the light traveling into the wavelength-selective filter preferably have the features of parallel light, as illustrated in FIG. 4, rather than the features of converging light, as illustrated in FIG. 3.

Further, as illustrated in FIG. 5, it is possible to convert light from an optical fiber into parallel light by attaching a lens to a light receiving element, but conversion of emissive light into parallel light depends on optical arrangement of an optical fiber 600 and a light receiving element 22. That is, as in FIG. 5, when laser light traveling into the light receiving element 22 by optical arrangement between the optical fiber 600 and the light receiving element 22 is converted into the parallel light, the optical fiber 600 should be accurately aligned with the focus of a lens 225, but when the optical fiber 600 is out of the focus of the lens 225, light passing through the lens 225 cannot be parallel light. However, when optical arrangement is achieved, as described above, the features of parallel light, converging light, and emissive light that laser light has in the light receiving element 22 depend on the degree of the optical arrangement, and a change in convergence of light is a phenomenon generated in the light receiving element 22, so it is difficult to know whether the laser light becomes parallel light in the light receiving element 22 in optical arrangement.

Accordingly, it is very difficult to convert light having the features of emissive light outside a light receiving element into parallel light inside the light receiving element, using a lens attached to the light receiving element in the light receiving module illustrated in FIG. 1 and the optical module for bidirectional communication illustrated in FIG. 2. Therefore, when the light receiving element is a wavelength-tunable light receiving element, it is difficult to make the laser light traveling into a wavelength-tunable selective filter into parallel light, so wavelength selectivity is low.

PRIOR ART DOCUMENT

Patent Document (Patent Document 1) Korean Patent No. 10-0724820 (May 28, 2007)

DISCLOSURE

Technical Problem

The present invention has been made in an effort to solve the problems and an object of the present invention is to provide a light receiving module that easily make laser light, which reaches a wavelength-tunable wavelength-selective filter, into parallel light in a wavelength-tunable light receiving element having a built-in optical fiber and a wavelength-tunable wavelength-selective filter.

Technical Solution

In order to achieve the object, the present invention proposes an optical module in which a window of a light receiving element is used as a window having the features of a flat plate instead of a lens type window and a lens is disposed between the light receiving element and an optical fiber so that laser light from the optical fiber is converted into parallel light through the lens and the parallel light travels into a wavelength-tunable wavelength-selective filter in the light receiving element.

Advantageous Effects

In an optical coupling structure that changes emissive light from an optical fiber into converging light that converges to a photodiode of a light receiving element using a lens attached to the light receiving element when the light receiving element and the optical fiber are optically coupled in the related art, a laser beam in a light receiving element has the features of converging light that converges to a point without having the features of parallel light, so the features of a wavelength-selective filter are deteriorated due to variable incident angles of light reaching the wavelength-selective filter when the wavelength-selective filter is disposed in the light receiving element. However, according to the present invention, this problem is removed and laser light traveling into a light receiving element is given the features of parallel light, so a wavelength-selective filter can select more wavelengths.

DETAILED DESCRIPTION OF THE PREFERRED EMBODIMENT

Hereinafter, preferred embodiments of the present invention are described in detail with reference to the accompanying drawings.

Figure 1:
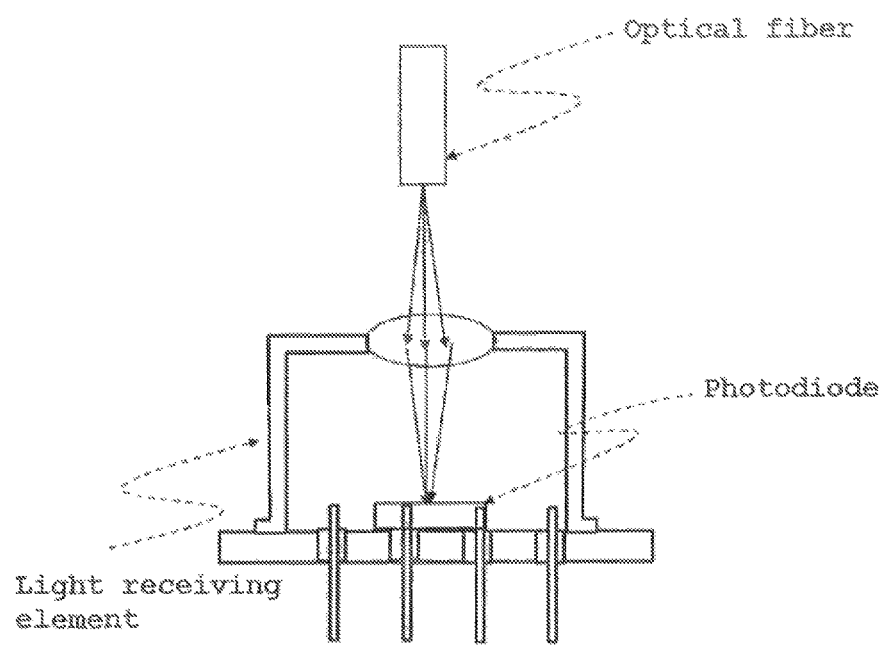
FIG. 1 is a conceptual diagram of a light receiving module for optical communication in the related art.
Figure 2:
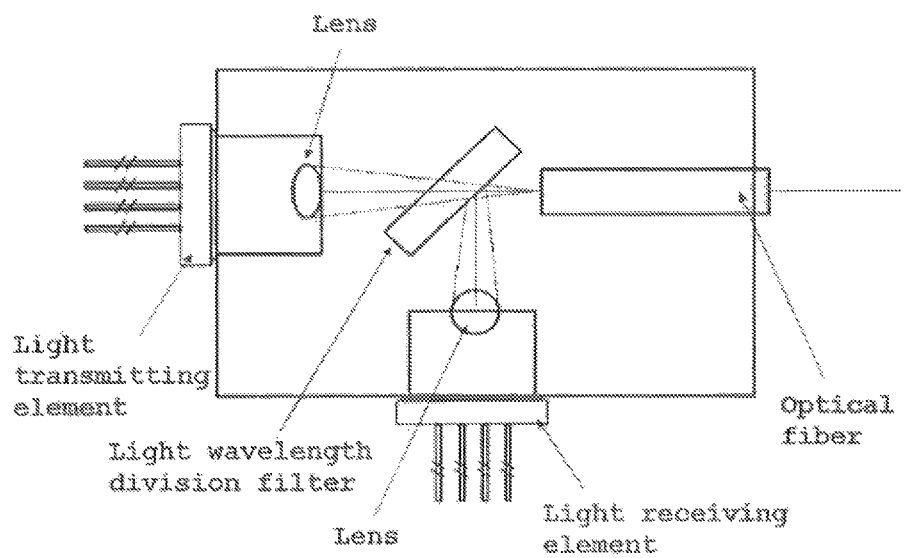
FIG. 2 is a conceptual diagram of a TO type optical module for bidirectional communication in the related art.
Figure 3:
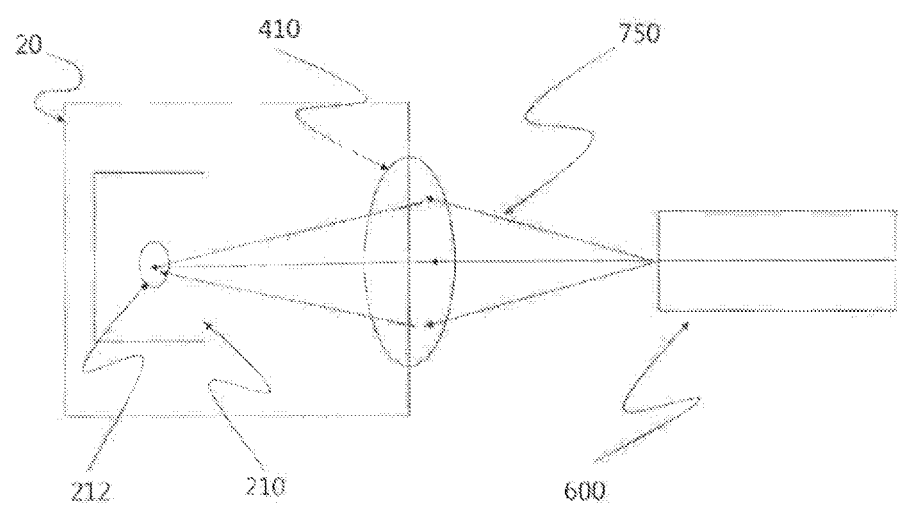
FIG. 3 is a light converging conceptual diagram of an optical module using a ball lens in the related art.
Figure 4:
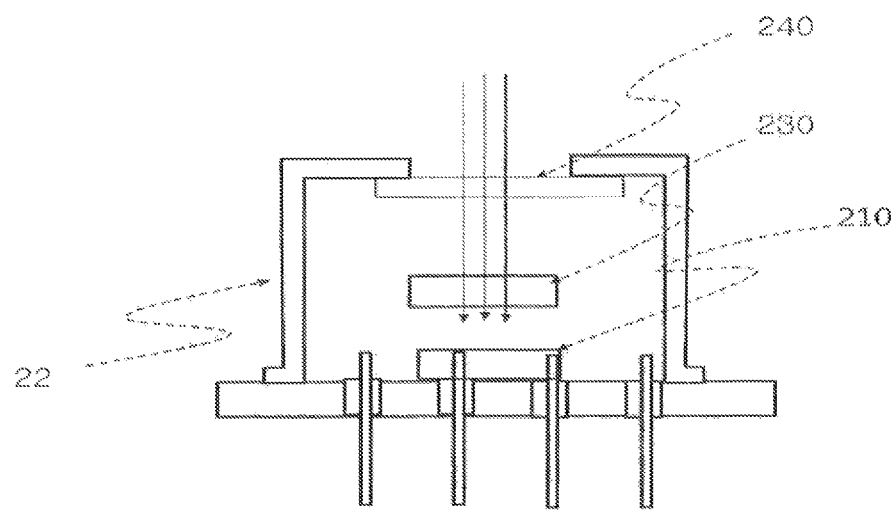
FIG. 4 is a conceptual diagram of a light receiving module having the features of parallel light in the related art.
Figure 5:
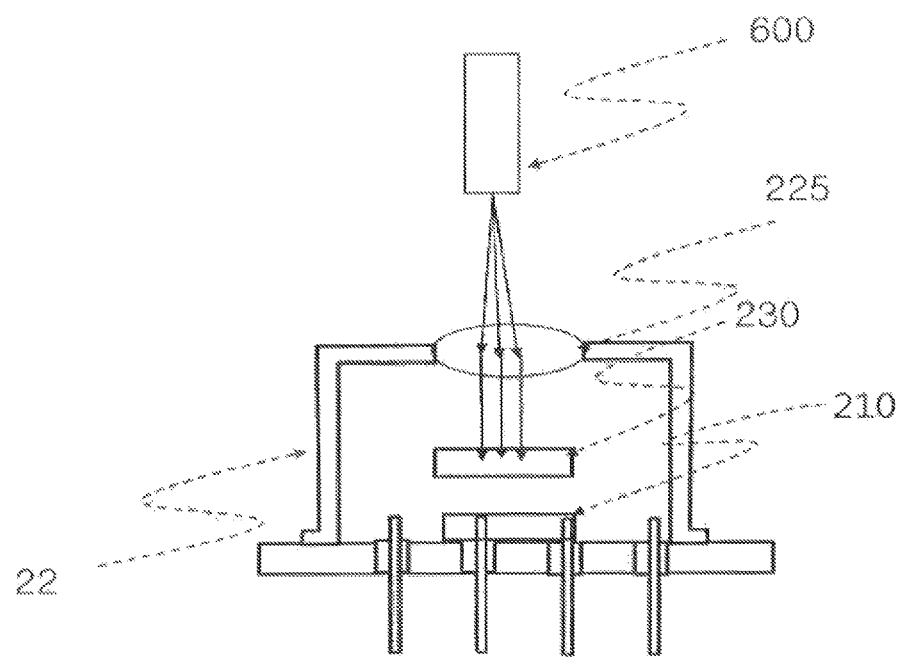
FIG. 5 is a conceptual diagram of a light receiving module converting light from an optical fiber into parallel light, using a lens attached to a light receiving element in the related art.
Figure 6:
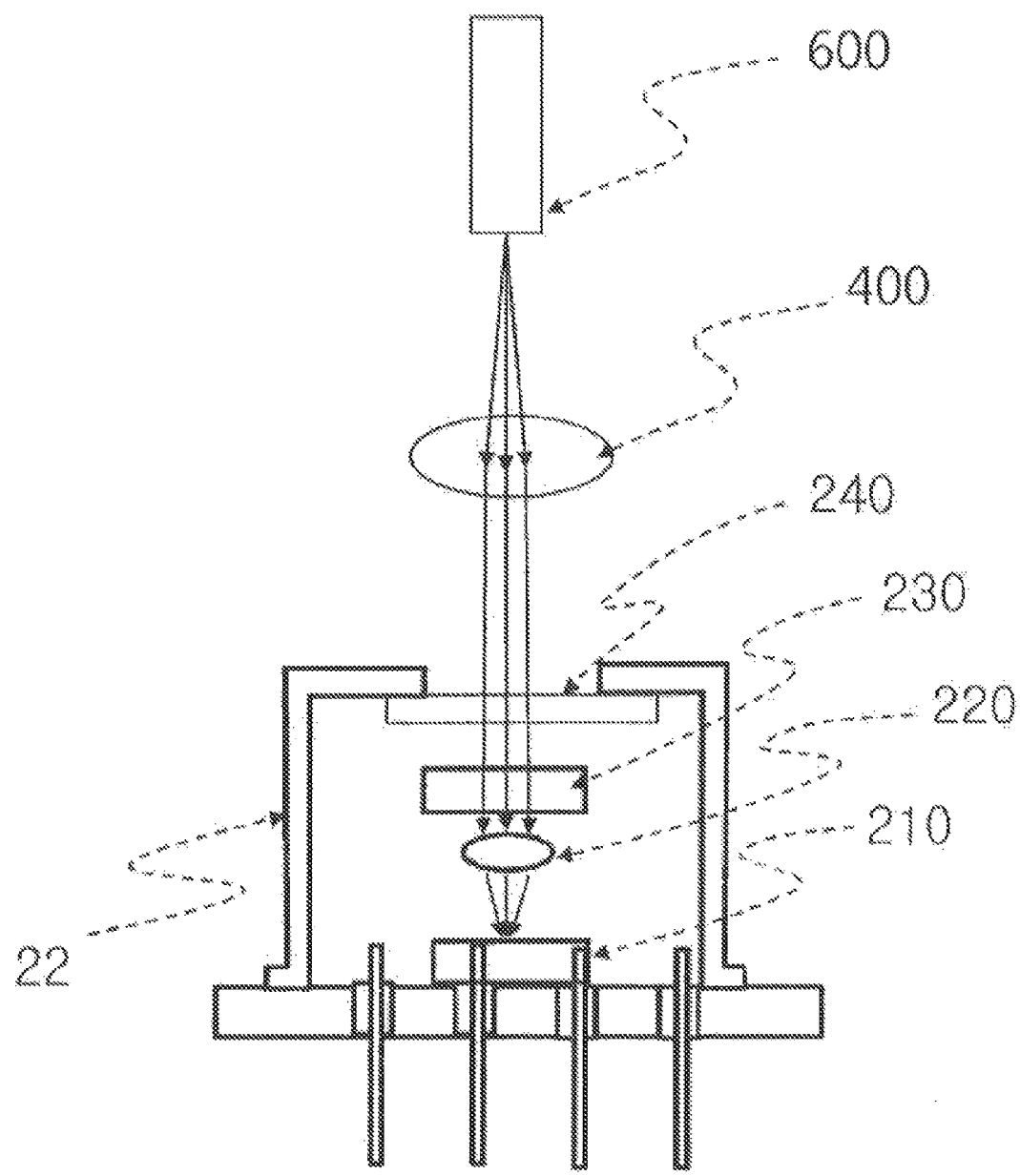
FIG. 6 is a diagram illustrating the configuration of a light receiving element having a built-in wavelength-tunable wavelength-selective filter using parallel light according to the present invention.

FIG. 6 is a diagram illustrating the configuration of a light receiving element having a built-in wavelength-tunable wavelength-selective filter using parallel light according to an embodiment of the present invention.

As illustrated in FIG. 6, an optical signal is outputted as emissive light having a predetermined emission angle from an optical fiber 600. The optical signal from the optical fiber 600 is converted into parallel light through a lens 400 separated from a light receiving element 22. The optical signal converted into parallel light by the lens 400 separated from the light receiving element 22 travels into the light receiving element 22 through a flat plate-shaped window 240. A wavelength-tunable wavelength-selective filter 230 having a flat plate shape is disposed in the light receiving element 22 and only the light having wavelengths transmitted by the wavelength-tunable wavelength-selective filter 230 travels into a photodiode 210 for receiving light, thereby achieving an object of receiving light. In this case, the light reflecting from the wavelength-tunable wavelength-selective filter 230 may travel out of the light receiving element 22. The wavelength-tunable wavelength-selective filter 230 may be a wavelength-tunable wavelength-selective filter that transmits different wavelengths in accordance with temperature, in which a heater or a thermoelectric cooler may be further provided to change the temperature of the wavelength-tunable wavelength-selective filter 230. A liquid crystal type etalon filter of which the transmissive wavelength is changed by voltage may be used for the wavelength-tunable wavelength-selective filter 230.

Meanwhile, light having a wavelength that passes through wavelength-tunable wavelength-selective filter 230 having a flat plate shape has the features of parallel light in FIG. 6, so a lens 220 for converting parallel light passing through the wavelength-tunable wavelength-selective filter 230 into converging light may be further disposed between the wavelength-tunable wavelength-selective filter 230 and the photodiode 210 to converge the light into a narrow light receiving area of the photodiode 210.

In FIG. 6, laser light having the features of emissive light and emitted from the optical fiber 600 is converted into parallel light by the lens 400, and when laser light from the optical fiber is converted into parallel light first and then the light receiving element 22 having the flat plate-shaped window 240 is optically aligned to the laser light converted into parallel light, the process of converting the laser light from the optical fiber 600 into parallel light through the lens 400 is performed without the light receiving element 22, so it is possible to easily check conversion of the emissive light from the optical fiber 600 into parallel light. Accordingly, it is possible to very easily optically align the optical fiber 600 and the lens 400 that converts the emissive light from the optical fiber into parallel light.

Meanwhile, the light receiving module that has the built-in wavelength-tunable wavelength-selective filter 230 and can tune the wavelength of an optical signal can be used not only for a single module composed of the optical fiber 600 and the light receiving element 22, but an optical module for bidirectional communication in which the optical fiber 600, the light receiving element 22, and a light transmitting element make one optical module.

Figure 7:
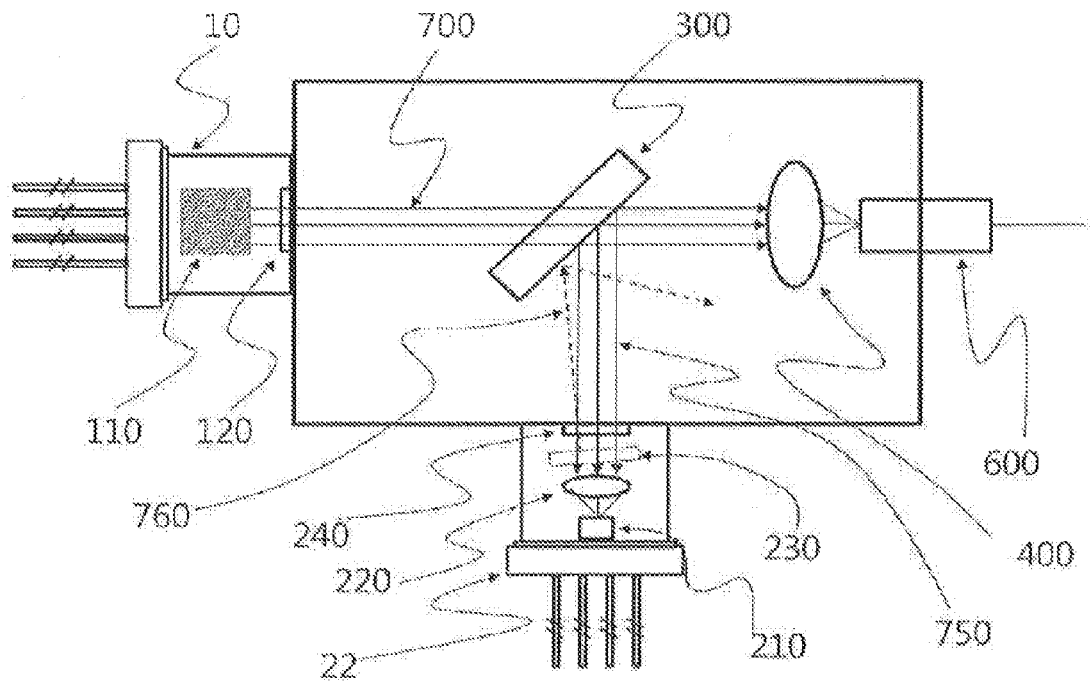
FIG. 7 is a diagram illustrating the configuration of an optical module for bidirectional communication in which a light transmitting element outputting parallel light and a wavelength-tunable light receiving element corresponding to input of parallel light perform bidirectional communication through one optical fiber, according to the present invention.

FIG. 7 illustrates an example of a structure of an optical module for bidirectional communication in which a light transmitting element 10 outputting parallel light and a wavelength-tunable light receiving element 22 corresponding to input of parallel light perform bidirectional communication through one optical fiber 600.

In general, in an optical module for bidirectional communication, a wavelength spacing of 10 nm or more may be defined between a transmission light wavelength and a reception light wavelength and the wavelength of a received optical signal changes within several nanometers at the most. Accordingly, even if signals with various wavelengths travel into the light receiving element 22, it is possible to effectively separate transmission signals and reception signals using the beam splitter 300. Laser light 900 outputted as parallel light from the light transmitting element 10 is converted into converging light by the lens 400 after passing through the beam splitter 300 and then optically coupled with the optical fiber 600, thereby making optical transmission communication. The optical fiber 600 and the lens 400 may be separately optically aligned to the light transmitting element 10 and the light receiving element 22, in which optical alignment is made by checking that the light from the optical fiber 600 is changed into parallel light by the lens 400. The light transmitting element 10 is independently assembled to output parallel light 700 regardless of optical alignment with the optical fiber 600 and the lens 400, and then the light transmitting element 10 and the optical fiber 600 are optically aligned. Since the light from the light transmitting element 10 is parallel light, the light transmitting element is easily optically aligned to the optical fiber 600 along a path opposite to the path along of which the light from the optical fiber 600 is converted into parallel light by the lens 400.

Since the laser light 750 from the optical fiber 600 is converted into parallel light by the lens 400, the light receiving element 22 including the flat plate-shaped window 240 and the wavelength-tunable wavelength-selective filter 230 can selectively receive a wavelength by easily separating a wavelength using the wavelength-tunable wavelength-selective filter 230.

Accordingly, it is possible to manufacture an optical module for bidirectional communication using the light receiving element 22 including the light transmitting element 10 outputting parallel light, flat plate-shaped window 240, and wavelength-tunable wavelength-selective filter 230.

In order for the wavelength-tunable wavelength-selective filter 230 to easily separate a wavelength in FIG. 7, laser light may travels into the wavelength-tunable wavelength-selective filter 230 at a right angle. AS described above, the light reflecting from the wavelength-tunable wavelength-selective filter 230, in the light having optical signal wavelengths that reaches vertically the wavelength-tunable wavelength-selective filter 230, returns to the optical fiber 600 through the beam splitter 300 and the lens 400, so it may act as noise to another optical element not illustrated in the figures.

Accordingly, in order to prevent the laser light reflecting from the wavelength-tunable wavelength-selective filter 230 from being optically coupled to the optical fiber 600, the wavelength-tunable wavelength-selective filter 230 may be inclined so that laser light 760 reflecting from the wavelength-tunable wavelength-selective filter 230 cannot return to the lens 400 and the optical fiber, even if it reflects from the beam splitter 300.

Figure 8:
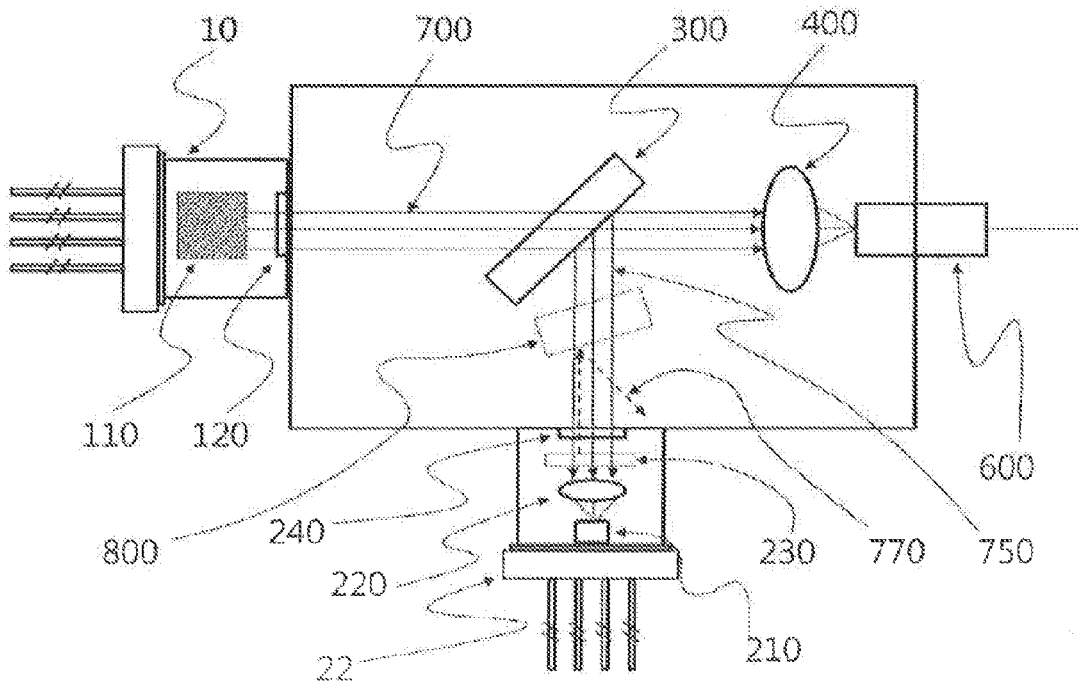
FIG. 8 is a diagram illustrating an example in which an optical isolator is disposed between a beam splitter and a light receiving element in the optical module for bidirectional communication illustrated in FIG. 7.

Further, as another method of preventing the laser light 760 reflecting from the wavelength-tunable wavelength-selective filter 230 from returning to the optical fiber 600, an optical isolator 800 that transmit optical signals only in one direction may be further disposed between the beam splitter 300 and the optical light receiving element 22, which is illustrated in FIG. 8.

Laser light 770 blocked by the optical isolator 800 between the beam splitter 300 and the light receiving element 22 cannot return into the optical module, so unnecessary laser light may be absorbed by applying an optical absorbent in the path of the laser light 770 blocked by the optical isolator 800.

Meanwhile, although the lens 400 is used to convert emissive light from the optical fiber 600 into parallel light in the embodiment of the present invention, optical fibers equipped with such a lens have been known in the art. In particular, Grin-Lens (graded index lens) has been used for a lens giving a high parallel feature to laser light from an optical fiber and it may be a very preferable embodiment of the present invention to use a part composed of an optical fiber and Grin-lens in a single unit.

The present invention is not limited to the embodiments described above and it should be understood that the present invention may be changed and modified in various ways by those skilled in the art within a range equivalent to the spirit of the present invention and claims to be described below.

DESCRIPTION OF MAIN REFERENCE NUMERALS OF DRAWINGS

10: Light transmitting element
110: External resonator type laser module
120: Flat plate-shaped window of light transmitting element
20: Light receiving element
22: Light receiving element having built-in wavelength-tunable wavelength-selective filter
210: Photodiode
212: Light receiving area of photodiode
230: Wavelength-tunable wavelength-selective filter
240: Flat plate-shaped window of light receiving element
300: Beam splitter
400: Lens
410: Lens
600: Optical fiber
700: Laser light traveling to optical fiber from light transmitting element
750: Laser light traveling to light receiving element from optical fiber
760: Laser light reflecting from wavelength-tunable wavelength-selective filter
770: Laser light reflecting from optical isolator
800: Optical isolator

The invention claimed is:
1. A light receiving module including a light receiving element having a built-in wavelength-tunable wavelength- selective filter receiving laser light from an optical fiber, wherein a flat plate-shaped window (240) transmitting laser light from an optical fiber (600) is formed in a light receiving element (22), and a wavelength-tunable wavelength-selective filter (230) for separating wavelengths of laser light traveling as parallel light is disposed in the light receiving element (22);

- a lens (400) configured to convert laser light which is received from the optical fiber (600) into parallel light is disposed between the optical fiber (600) and the light receiving element (22);
- a lens (220) configured to convert parallel light passing through the wavelength-tunable wavelength-selective filter (230) into converging light is disposed between the wavelength-tunable wavelength-selective filter (230) and a photodiode (210) in the light receiving element (22) thereby converging the parallel light into a narrow light receiving area of the photodiode (210); and
- a heater or a thermoelectric cooler is provided to change the temperature of the wavelength-tunable wavelength-selective filter (230) that transmits different wavelengths in accordance with temperature.

2. The light receiving module of claim 1, wherein the wavelength-tunable wavelength-selective filter (230) is inclined so that a laser light (760) reflecting from the wavelength-tunable wavelength-selective filter (230) cannot return to the lens (400) and the optical fiber (600).

3. The light receiving module of claim 2, wherein a beam splitter (300) is further disposed at 45 degrees to transmit or reflect light in accordance with a wavelength, between the optical fiber (600) and the light receiving element (22), and the lens (400) is disposed between the optical fiber (600) and a beam splitter (300), and the wavelength-tunable wavelength-selective filter (230) is inclined so that a laser light (760) reflecting from the wavelength-tunable wavelength-selective filter (230) cannot return to the lens (400) and the optical fiber (600), even if it reflects from the beam splitter (300).

4. The light receiving module of claim 3, wherein a light transmitting element (10) outputting parallel light is further disposed at a side of the beam splitter (300) to perform bidirectional communication using the optical fiber (600).

5. The light receiving module of claim 3, wherein an optical isolator (800) transmitting optical signals only to the light receiving element is further disposed between the beam splitter (300) and the light receiving element (22).

6. The light receiving module of claim 1, wherein the lens (400) and the optical fiber (600) are integrated.

7. The light receiving module of claim 6, wherein the lens (400) is a graded index type lens.

8. The light receiving module of claim 1, wherein an optical isolator (800) transmitting optical signals only in one direction is further disposed between the optical fiber (600) and the light receiving element (22).

* * * * *